No. 749,947. Patented January 19, 1904.

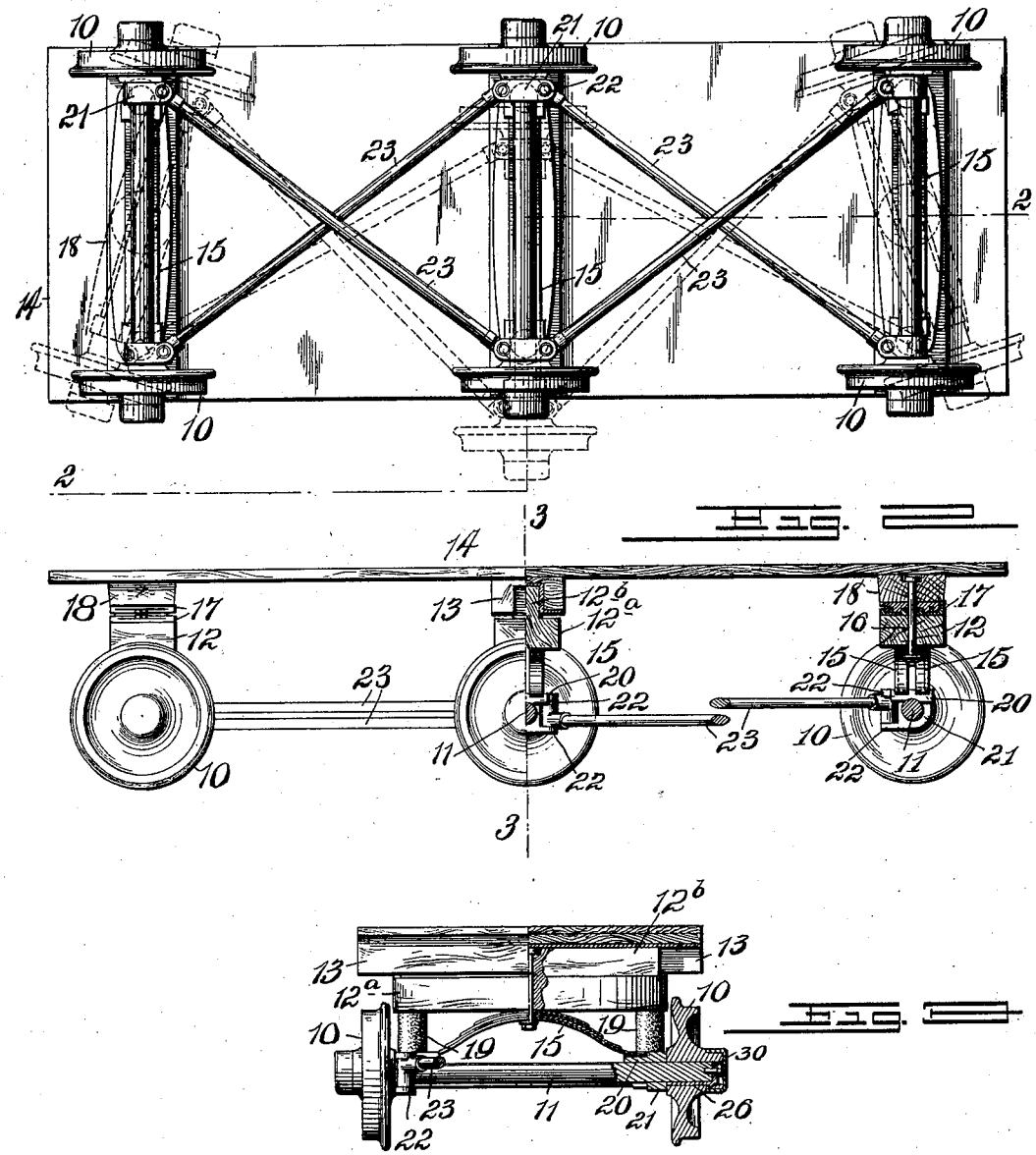

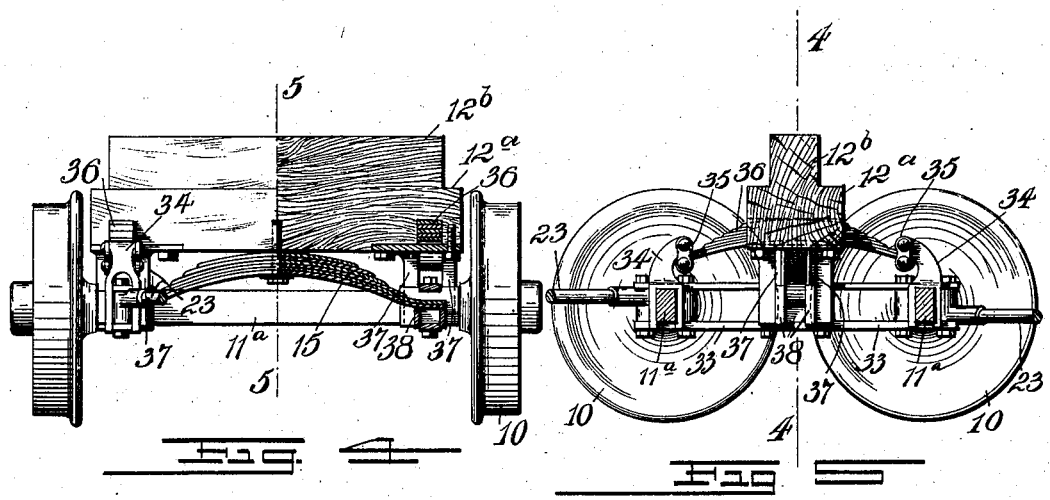

UNITED STATES PATENT OFFICE.

CARL NORDELL, OF STAMFORD, CONNECTICUT.

RAILWAY-TRUCK.

SPECIFICATION forming part of Letters Patent No. 749,947, dated January 19, 1904.

Application filed March 26, 1903. Serial No. 149,627. (No model.)

*To all whom it may concern:*

Be it known that I, CARL NORDELL, of Stamford, Fairfield county, Connecticut, have invented certain new and useful Improvements in Railway-Trucks, of which the following is a full, clear, and exact description.

My invention relates to improvements in railway-trucks; and the object of my invention is to produce a strong, simple, yet flexible truck adapted for use on all kinds of rolling-stock, both for light traffic, such as that of trolleys and street-railways, and heavy coaches or freight-cars.

The special object of my invention is to produce increased flexibility in the truck without decreasing its strength, to the end that for passenger traffic the coach may be made to ride easily and without straining the truck, and more particularly to provide a simple means by which the middle portion of the truck or of the trucks, in case several are used, may slide laterally while the end portions swivel, so that the truck may take a sharp curve without straining its parts and without straining any part of the car which it carries.

My invention also comprises a structure designed to lessen the cost of a good truck and in general to produce a better truck than is at present used.

With these ends in view my invention consists of a railway-truck, the construction and arrangement of which will be hereinafter described and claimed.

Reference is to be had to the accompanying drawings, forming part of this specification, in which similar figures of reference refer to similar parts throughout the several views.

Figure 1 is an inverted plan or bottom view of the truck embodying my invention, the dotted lines showing its movement when taking a curve. Fig. 2 is a view half in section on the line 2 2 of Fig. 1 and half in elevation. Fig. 3 is a view, partly in end elevation and partly in cross-section, on the line 3 3 of Fig. 2. Fig. 4 is a view, partly in end elevation and partly in cross-section, on the line 4 4 of Fig. 5; and Fig. 5 is a section on the line 5 5 of Fig. 4.

The truck is provided with car-wheels 10, which, except for their bearings, may be of any usual construction, and these turn on the axles 11, the usual car practice not being followed in this instance, as I find it advantageous to have the wheel turn on the axle. The truck is also provided with suitable bolsters 12, the middle bolster $12^a$ having a raised rib $12^b$, which may or may not be integral with the bolster and which slides laterally in a guideway 13, produced on the bottom of the car 14 or other vehicle. The several bolsters are supported by leaf-springs 15, arranged, preferably, in pairs, and through the central part of the end bolsters extend the king-bolts 16, these serving to bind the springs also in place, and the end bolsters are provided with the ordinary turn-plates 17, arranged between the bolsters and the beams 18 of the car. In addition to the leaf-springs just described the bolsters are preferably supported on end cushions 20, which may be of the usual rubber variety. For light traffic I prefer the arrangement shown in Figs. 1 to 3, in which three pairs of truck-wheels are used, and in carrying out the invention I provide the axles at points near the wheels with clips 21, which have preferably bearing-plates 20 thereon, on which rest the free ends of the springs 15. The clip 21 has also ears 22, between which are pivoted the ends of the brace-rods 23, which are arranged in pairs and which cross each other, as shown clearly in Fig. 1, the brace extending from one of the axles near the end to the next axle near the opposite end. Obviously the brace-rods may be differently supported; but they should be pivotally connected, so as to provide for the necessary movement of the parts and at the same time properly brace the truck members. It will be seen that in rounding a curve the end portions of the truck will turn on the king-bolts 16, while the middle portion will slide laterally, moving to the position shown by dotted lines in Fig. 1, and thus the truck can take a sharp curve with the greatest ease and without straining any part of the structure.

In Figs. 4 and 5 I have shown an arrangement adapted for use in the construction of a heavy truck in which the middle section of the truck has four wheels instead of two, as in Fig. 1. As here shown, the axles $11^a$ of the middle section are preferably squared and connected by the side bars 33, while they also support clips 34, these connecting with the braces 33 in the manner already described, but extending up also, so as to form supports for the pivotal links 35, which carry the ends of the leaf-springs 36, these being arranged at right angles to the springs 15 and providing an additional means of support for the bolster 12ª and its load. With this style of truck I prefer also to use guides to relieve the strain from the truck-bolster and its supports, these guides being depending legs 37, which are secured to the bolster 12ª at the ends and which move vertically in ways 38, which are carried by the side bars 33. These side bars also support the free ends of the spring 15. It will be seen that in practice the middle section (shown in Figs. 4 and 5) works exactly as in Fig. 1—that is, the said middle section will slide in relation to the car-floor, while the end portions will turn, as already specified. In either event it will be seen that the truck is extremely flexible, that it has the necessary strength, and that it is made without any great complication.

Having thus described my invention, what I claim as new, and desire to secure by Letters Patent, is—

1. A car-truck comprising a middle section supported on wheels and arranged to have a sliding connection with its load, end sections supported on wheels and arranged to swivel in relation to their load, leaf-springs supporting the load of the several sections, and cross-rods pivotally connecting the axles of the several sections.

2. A car-truck comprising a middle section having a non-rotary axle, supporting-wheels and a bolster carried by the axle, the bolster being arranged to slide in relation to its load, end sections having non-rotary axles, supporting-wheels and arranged to swivel in relation to their load, and cross-rods connecting the axles, said rods being pivoted at the ends.

3. In a car-truck, the combination with the parallel axles and the wheels supporting them, of a bolster, leaf-springs hung on the axles and arranged at right angles thereto so as to support the bolster, and a second spring parallel with the bolster, the said spring having its ends supported from the above-mentioned axles.

4. In a car-truck, the combination with the parallel axles, of clips fitting the said axles, leaf-springs hung on the said clips, a bolster supported on the said leaf-springs, and means as the way carried by the axles and the legs hung on the bolster for guiding the bolster.

5. The herein-described truck-section, comprising a transverse bolster, springs supporting the bolster end, a guiding device to prevent displacement of the bolster, a pair of axles carrying the above-mentioned spring ends, and a second spring arranged beneath and parallel with the bolster, the said spring having its ends carried by the axles.

6. The herein-described truck-section comprising a bolster shaped to have a sliding connection with its load, a pair of parallel connected axles, clips supported on the axles, parallel leaf-springs hung in the clips and supporting the bolster ends, a second spring at right angles to the first springs and arranged to support the bolster and means as the legs on the bolster and the ways carried by the axles for guiding the bolster.

In testimony whereof I have signed my name to this specification in the presence of two subscribing witnesses.

CARL NORDELL.

In presence of—
WARREN B. HUTCHINSON,
J. G. DUNBAR.